United States Patent [19]

Lan

[11] Patent Number: 5,235,698

[45] Date of Patent: Aug. 10, 1993

[54] BUS INTERFACE SYNCHRONIZATION CONTROL SYSTEM

[75] Inventor: Ray-Yuan Lan, Taipei, Taiwan

[73] Assignee: Acer Incorporated, Taipei, Taiwan

[21] Appl. No.: 405,986

[22] Filed: Sep. 12, 1989

[51] Int. Cl.⁵ .............................................. G06F 1/12
[52] U.S. Cl. .................................................. 395/550
[58] Field of Search ................. 364/200, 900; 395/550

[56] References Cited

U.S. PATENT DOCUMENTS

| | | | |
|---|---|---|---|
| 4,095,267 | 6/1978 | Morimoto | 395/550 |
| 4,241,418 | 12/1980 | Stanley | 395/550 |
| 4,439,829 | 3/1984 | Tsiang | 395/425 |
| 4,819,164 | 4/1989 | Branson | 395/550 |
| 5,033,001 | 7/1991 | Ibi | 395/550 |

OTHER PUBLICATIONS

CS8221 New Enhanced at (NEAT ™) Data Box 82C211/82C212/82C215/82C206 (IPC) CHIPSet ™, Pub. #2-221-B 10M, Mar. 1988, Rev. 2.

Primary Examiner—Eugene R. LaRoche
Assistant Examiner—Michael C. Kessell
Attorney, Agent, or Firm—Kenneth M. Kaslow

[57] ABSTRACT

The interface control system of this invention renders a high speed CPU compatible with low speed expansion devices such as expansion interfaces. The system causes the CPU clock signal to be in phase with the interface clock signal at the end of the last cycle of an interface cycle. At the end of the interface cycle, the system selects between a positive high speed and a negative high speed clock to be the CPU clock signal applied to the CPU.

13 Claims, 16 Drawing Sheets

BUS INTERFACE SYNCHRONIZATION CONTROL SYSTEM

BACKGROUND OF THE INVENTION

This invention is directed towards an interface control system and in particular towards systems for controlling the timing relationships of clock signals which control data access through interfaces. This invention is particularly suitable for application in computer systems where high speed central processing units are used to access low speed expansion devices of standard specifications, such as "expansion interfaces".

Computer users frequently desire to have expansion interfaces for specific purposes. For this reason many computer systems have expansion buses for connection to expansion interfaces. Furthermore, in order for the expansion interfaces to be compatible with many computer systems, the expansion interfaces are usually designed to have a standard specification. Such specification includes for example predetermined timing relationships and requirements.

To facilitate communication with expansion interfaces, a standard clock is defined for such interfaces and a standard cycle of the interfaces is defined as a preset number of standard clock cycles, during which the interfaces are accessed. In principle, at the end of a standard cycle, a central processing unit (CPU) may conclude its cycle after completing data access to the interface.

Expansion interfaces of standard specification are usually of low speed. With the advent of higher speed CPU's, the CPU cycles may not end at the end of a standard cycle for such low speed expansion devices. In such event, the computer system employing such CPU's are not entirely compatible with the expansion interfaces. This will not only affect the efficiency of the computer system when such interfaces are employed but may also cause the system to malfunction.

It is therefore desirable to provide an interface control system in which the above described difficulties are alleviated.

SUMMARY OF THE INVENTION

The interface control system of this invention is for controlling data access through an interface having a standard cycle for data access. The system comprises a controller, means for applying to the interface an interface clock signal and means for generating a controller clock signal. The interface signal has a frequency and phase such that it changes logic state at the end of the standard cycle. The controller clock signal is at a higher frequency than the interface clock signal. The system further comprises means for adjusting the controller clock signal to provide an output that also changes state at the end of the standard cycle and for applying said output to the controller to enable data access through the interface.

DETAILED DESCRIPTION OF THE INVENTION

Figure 1:
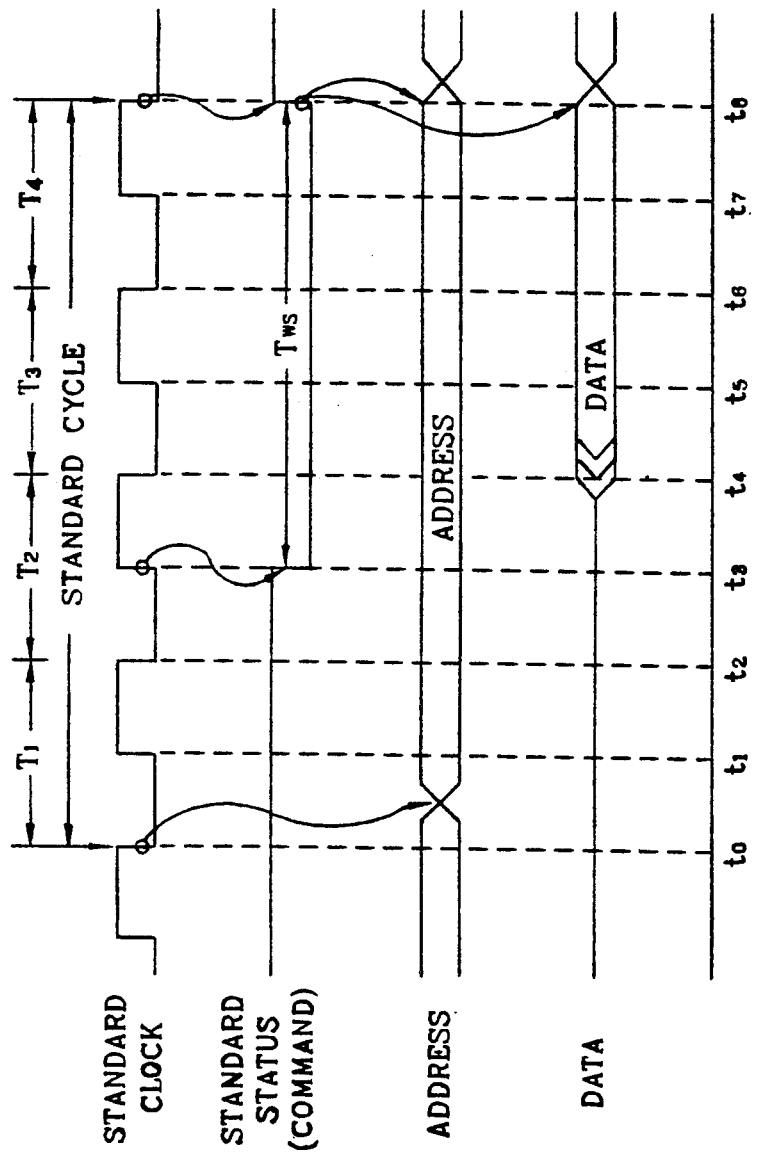
FIG. 1 is a timing diagram to illustrate the timing relationship of signals for accessing a standard expansion interface.

FIG. 1 is a timing diagram to illustrate the timing relationship of signals for accessing a typical standard expansion interface. As shown in FIG. 1, the standard clock is the clock signal for accessing a standard expansion interface, where four standard clock cycles form a standard cycle. Status (e.g. command) signals are read-write signals applied to the standard expansion interface. In order to access the interface, the status signal must have sufficient duration or width shown as Tws in FIG. 1. The address signal in FIG. 1 conveys the address of the standard expansion interface at which access is desired. The data signal carries the data to be stored into or read from the standard expansion interface. In principle, when the standard expansion interface receives, from an expansion bus standard clock, status and address signals which comply with the above standard specifications, then at the end of the standard cycle or at time t8, the CPU can conclude a CPU cycle, at which time it also completes access to the standard expansion interface. However, in some interface control techniques employed by some conventional computer systems to access expansion interfaces, the CPU cycle and the standard cycle do not end at the same time. Thus such conventional computer systems and the standard expansion interfaces are not completely compatible. This may affect system efficiency and may cause the system to malfunction.

Figure 2:
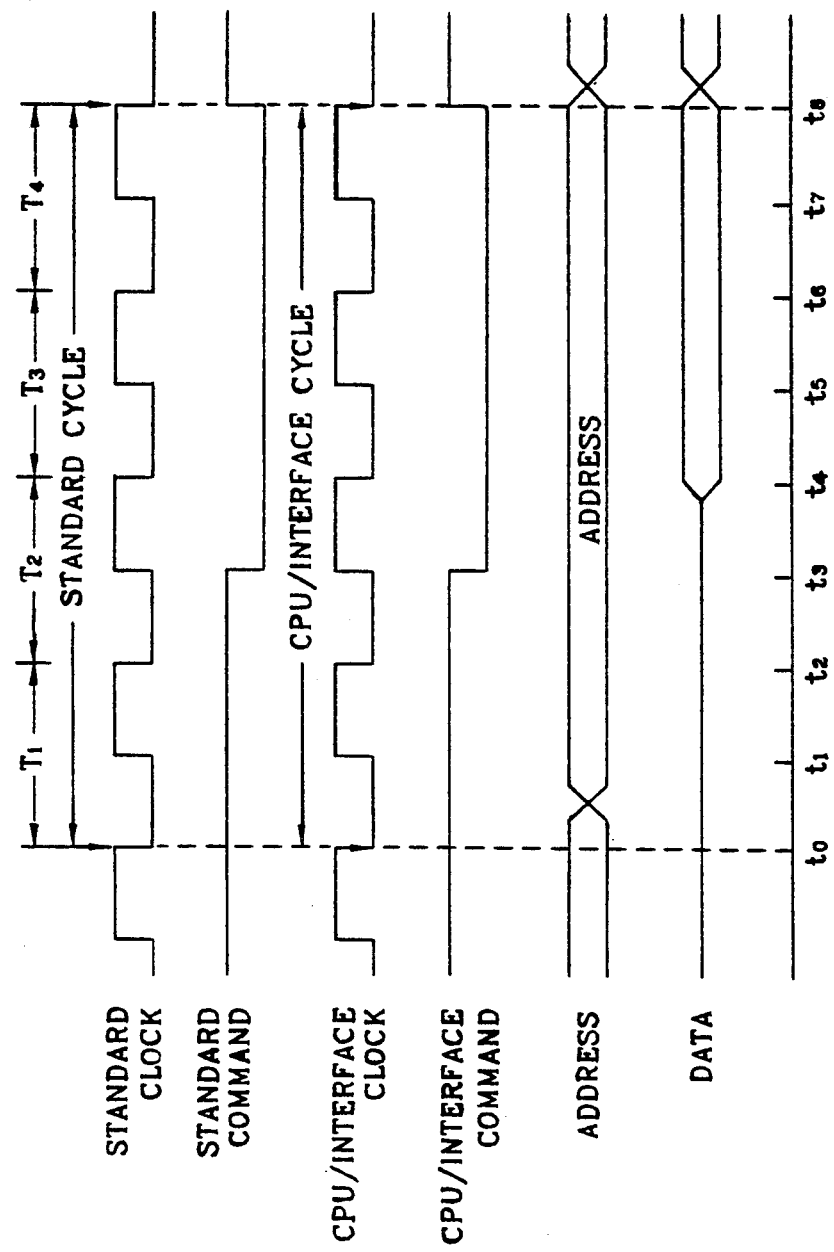
FIGS. 2–8 are timing diagrams to illustrate the timing relationship of signals for accessing standard expansion interfaces where conventional interface control systems are used for accessing.

FIGS. 2–8 are timing diagrams illustrating the timing relationship of signals where conventional interface control systems of CPU's are used for accessing standard expansion interfaces. As shown in FIG. 2, the signals required for accessing the standard expansion interface through an expansion bus comply completely with the standard specifications. In other words, not only does the CPU clock has the same frequency and phase as the standard clock of the standard expansion interface, the interface clock also has the same frequency and phase as the standard clock. The CPU and interface cycles for accessing the interface are the same as the standard cycle. In such circumstances, the access signals supplied by the CPU completely comply with the specifications of the standard expansion interface. Therefore, when the CPU concludes a CPU cycle, the CPU may access the interface in order to store or retrieve data. With the advent of faster CPU's when such faster CPU's are used to access slow standard expansion interfaces, conventional solutions for enabling such access are not entirely satisfactory.

Figure 3:
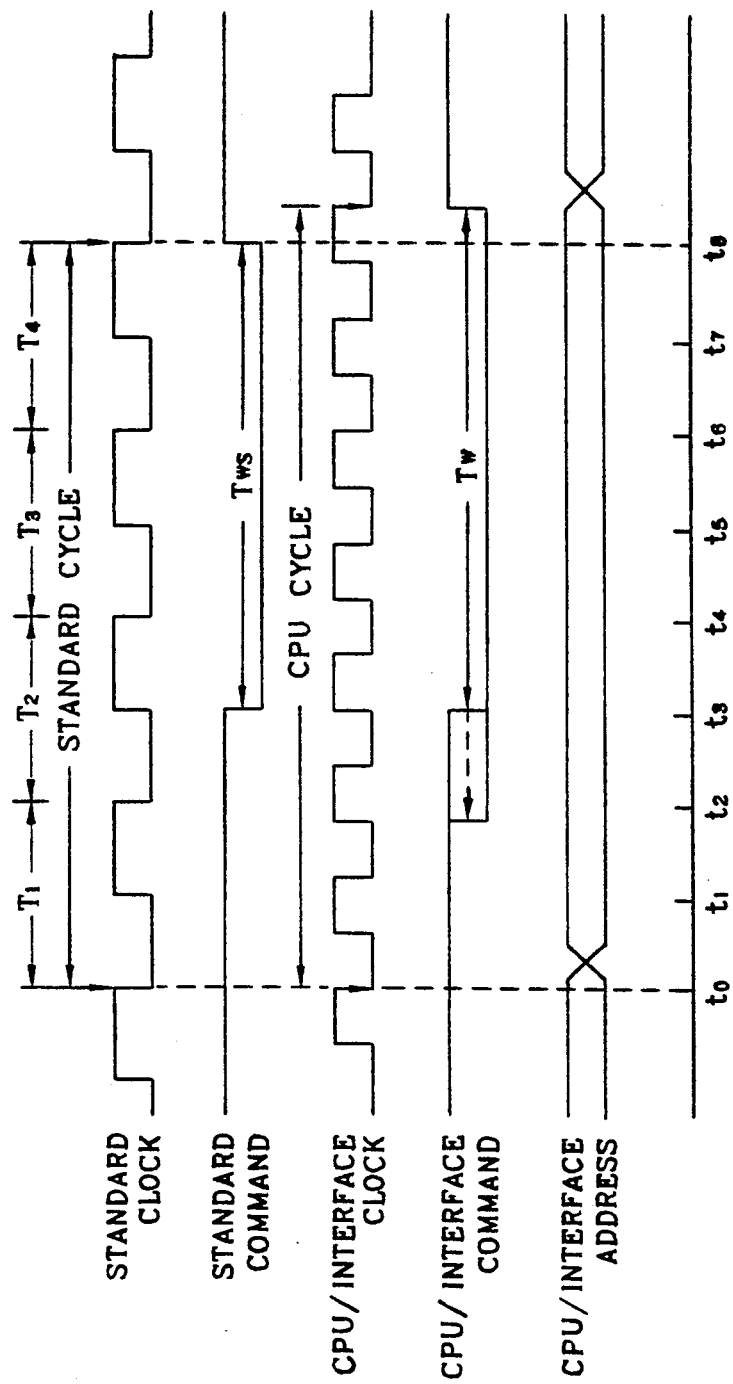

FIG. 3 is a timing diagram illustrating how a fast CPU may access a standard expansion interface in a conventional technique. As shown in FIG. 3, the CPU clock and the CPU command signals have the same frequency and phase as the interface clock and command signals. Moreover, when the standard cycle concludes at time t8, while the width or duration of the CPU/interface command signal does comply with that required for a standard command (i.e. Tw≧Tws), but at time t8, the CPU/interface clock does not change state. Hence the CPU must wait until the conclusion of the CPU cycle at a time after t8 before the CPU may complete its access to the interface for storing or retrieving data.

In the above-described interface control system, since the interface clock is faster than the standard clock, the system may malfunction. Besides, the CPU cycle ends at a time different from that of the standard cycle. Hence, when the CPU must access the interface two or more times consecutively, after a standard cycle comprising four standard clock cycles is completed, the CPU cannot immediately proceed to access the interface during the next standard cycle comprising another four standard clock cycles. This is apparent from FIG. 3. In other words, the CPU must wait and therefore waste a few CPU clock cycles before it can proceed to access the interface after a previous access. This slows down the process and degrades the efficiency of the system.

Figure 4:
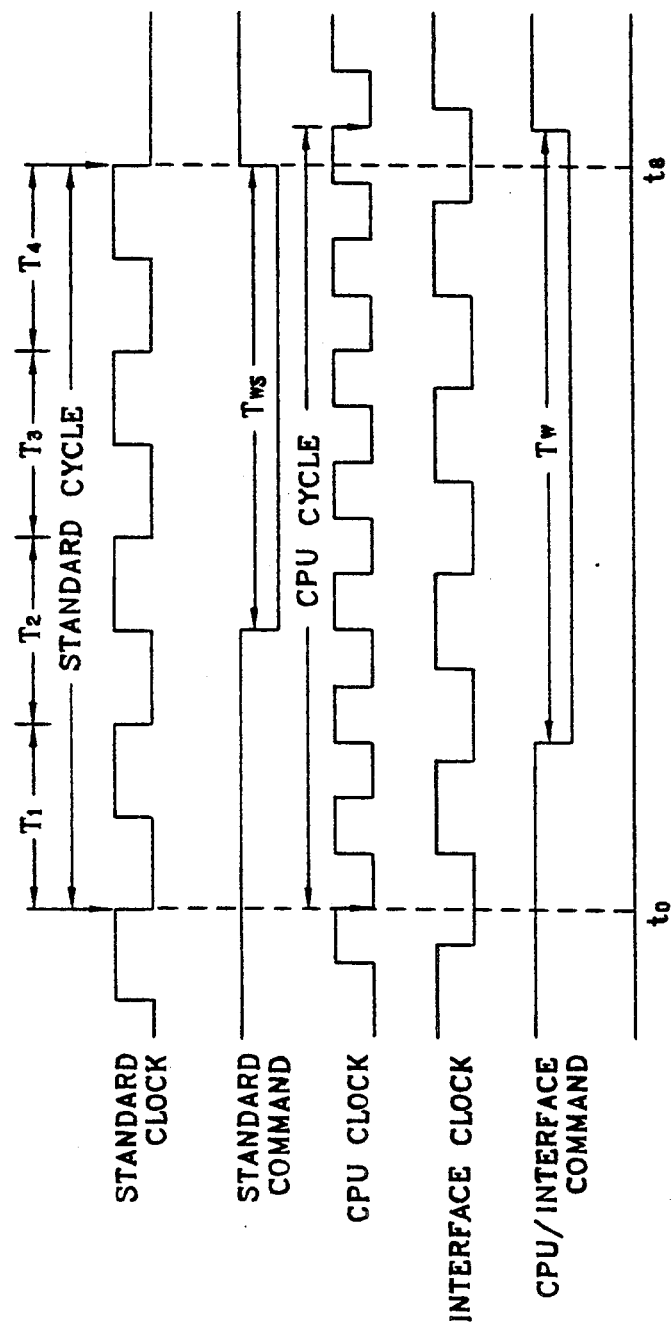

FIG. 4 is a timing diagram where the CPU clock and the interface clock have different origins so that their frequency and phase are different. As shown in FIG. 4, even though the interface clock has the same frequency as the standard clock, the two clocks have different phases. At the end of the standard cycle, even though the duration or width of the CPU/interface command complies with the requirement for the standard command, because the CPU clock does not change state at the end of the standard cycle, the CPU must wait until the end of a CPU clock cycle after t8 before the CPU can complete data access. Thus, as in the case of FIG. 3, the system is inefficient.

Figure 5:
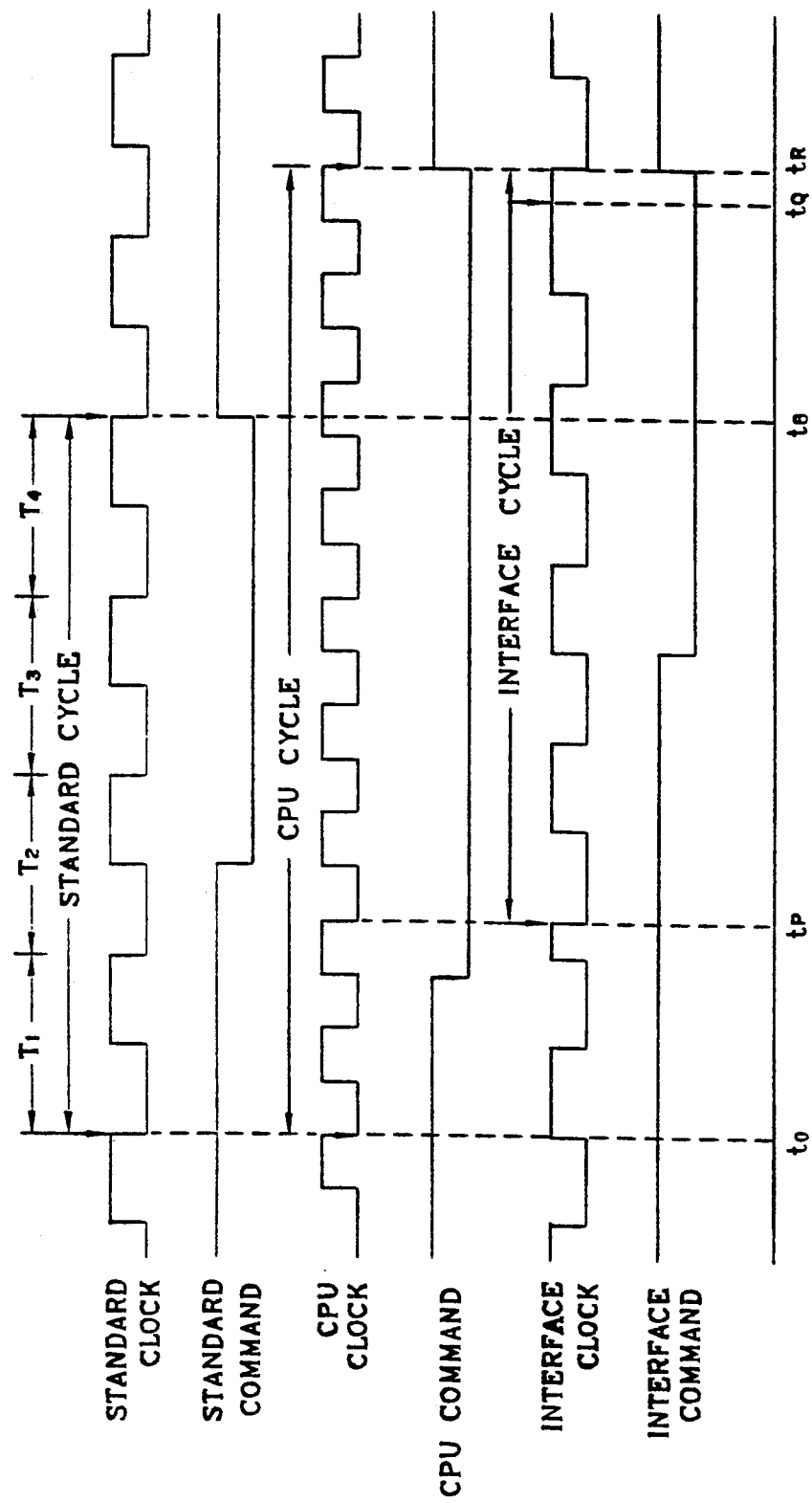

FIG. 5 is a timing diagram to illustrate a conventional interface control system where, under normal circumstances, the frequencies of the interface and standard clocks are the same but where the two clocks have different phases. However, when a CPU is accessing the standard interface, the phase of the interface clock is adjusted at time tp so that from time tp onwards, the interface clock and the standard clock are not in phase. In addition, before the CPU completes is access to the standard interface, or at time tQ, the interface clock would ordinarily change from "1" to "0". In order for the interface clock and CPU clock to fall from "1" to "0" at the same time, the interface clock signal is forced to remain at "1" until time tR, at which time the interface clock is permitted to fall from "1" to "0". By such methods, even though the interface and CPU cycles now conclude at the same time, but the frequency of the interface clock has been adjusted so that it is no longer constant. Hence, when the interface system or other devices outside the interface system must employ a constant frequency interface clock, the entire system may malfunction. Furthermore, the CPU cycle and the standard cycle do not conclude at the same time so that the system is inefficient for reasons explained above.

Figure 6:
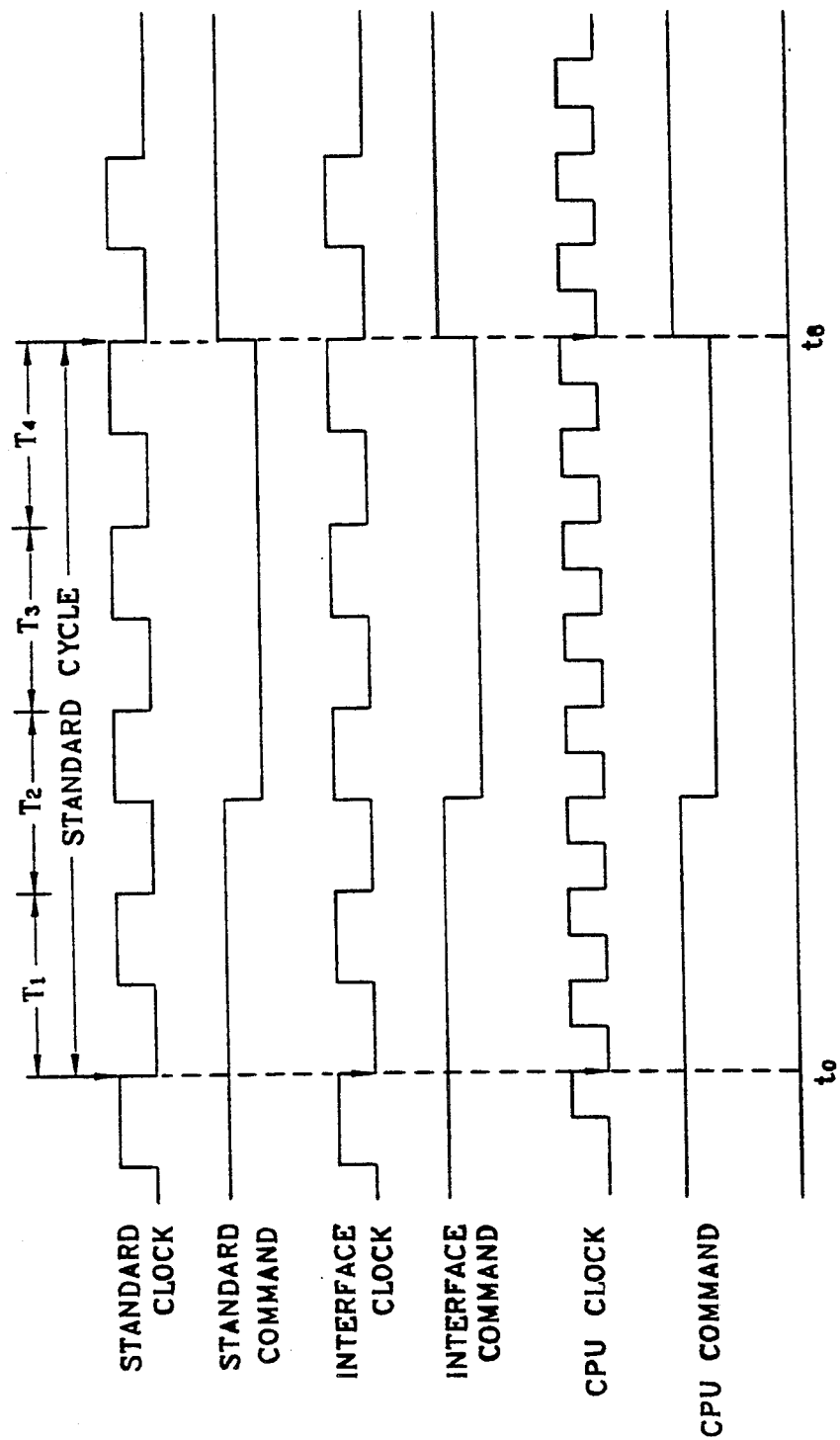

FIG. 6 is a timing diagram illustrating a conventional interface control system where the interface clock and the standard clock have the same frequency and phase and where the frequency of the CPU clock is an integral multiple of the frequency of the interface clock. Furthermore, the standard clock, the interface clock and the CPU clock have the same phase at the beginning and the end of the standard cycle. Hence, when the CPU is accessing the interface, the CPU may store or retrieve data at the end of a CPU cycle which coincides with the end of the standard cycle. However, the greatest limitation of such convention or technique is that the frequency of the CPU clock signal must be an integral multiple of the interface clock signal. Where the frequency of the CPU clock system is not an integral multiple of the interface clock, the two different clock systems may still be incompatible.

Figure 7:
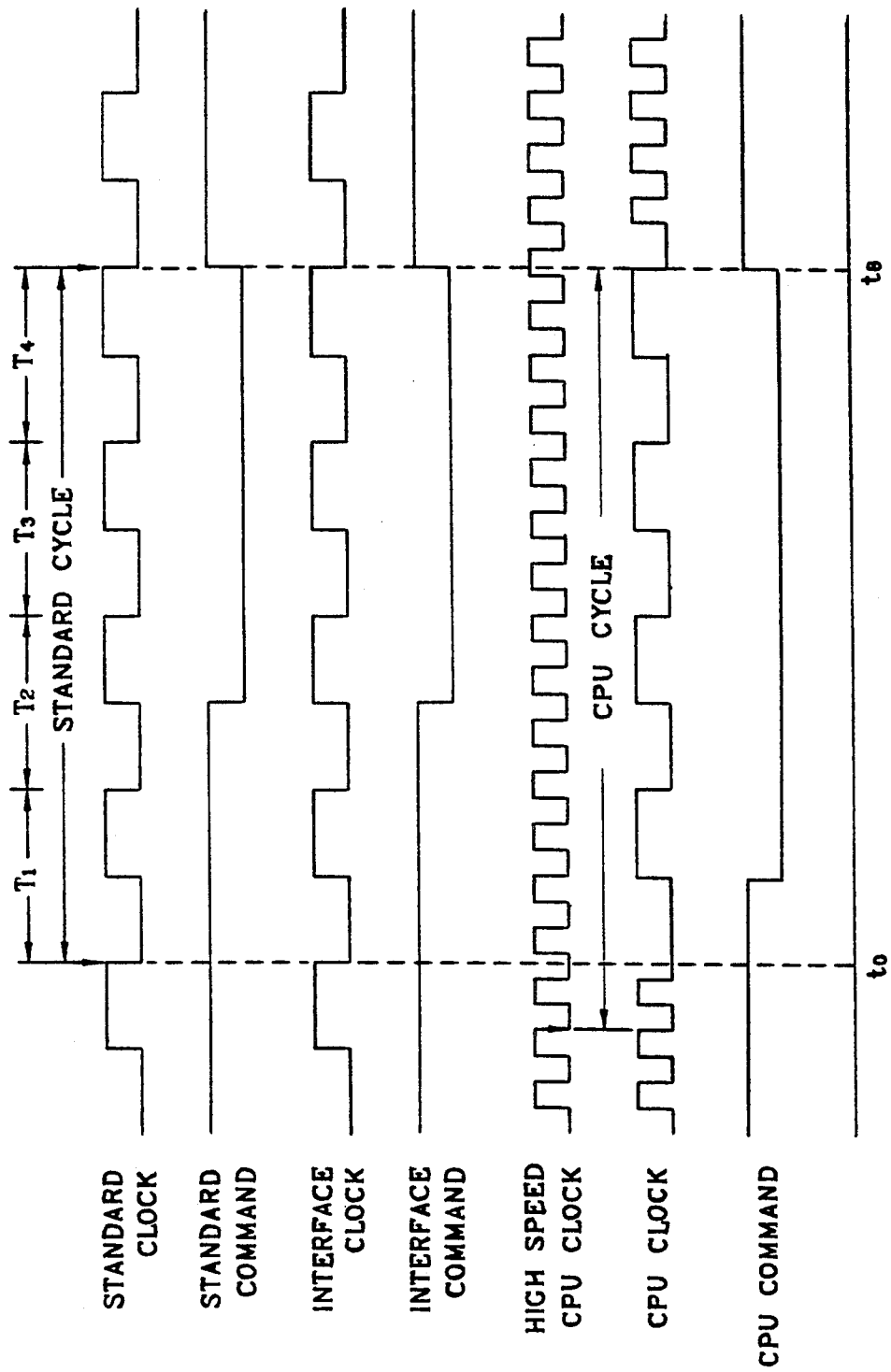

FIG. 7 is a timing diagram illustrating an interface control system where ordinarily the CPU clock has a higher frequency than the interface clock but when the CPU is accessing the interface during a standard clock cycle, the CPU clock is forced to have the same frequency and phase as the interface clock. This permits the CPU clock signal to comply with the specification of expansion interfaces. The CPU cycle, the interface cycle and the standard clock cycle all conclude at the same time. However, if the CPU carries on processes which are operated in parallel to the process of accessing the expansion interface, during the CPU cycle when the CPU is accessing the interface, the fact that the CPU clock is altered from high frequency to low frequency seriously degrades its efficiency in carrying out such parallel processes.

Figure 8:
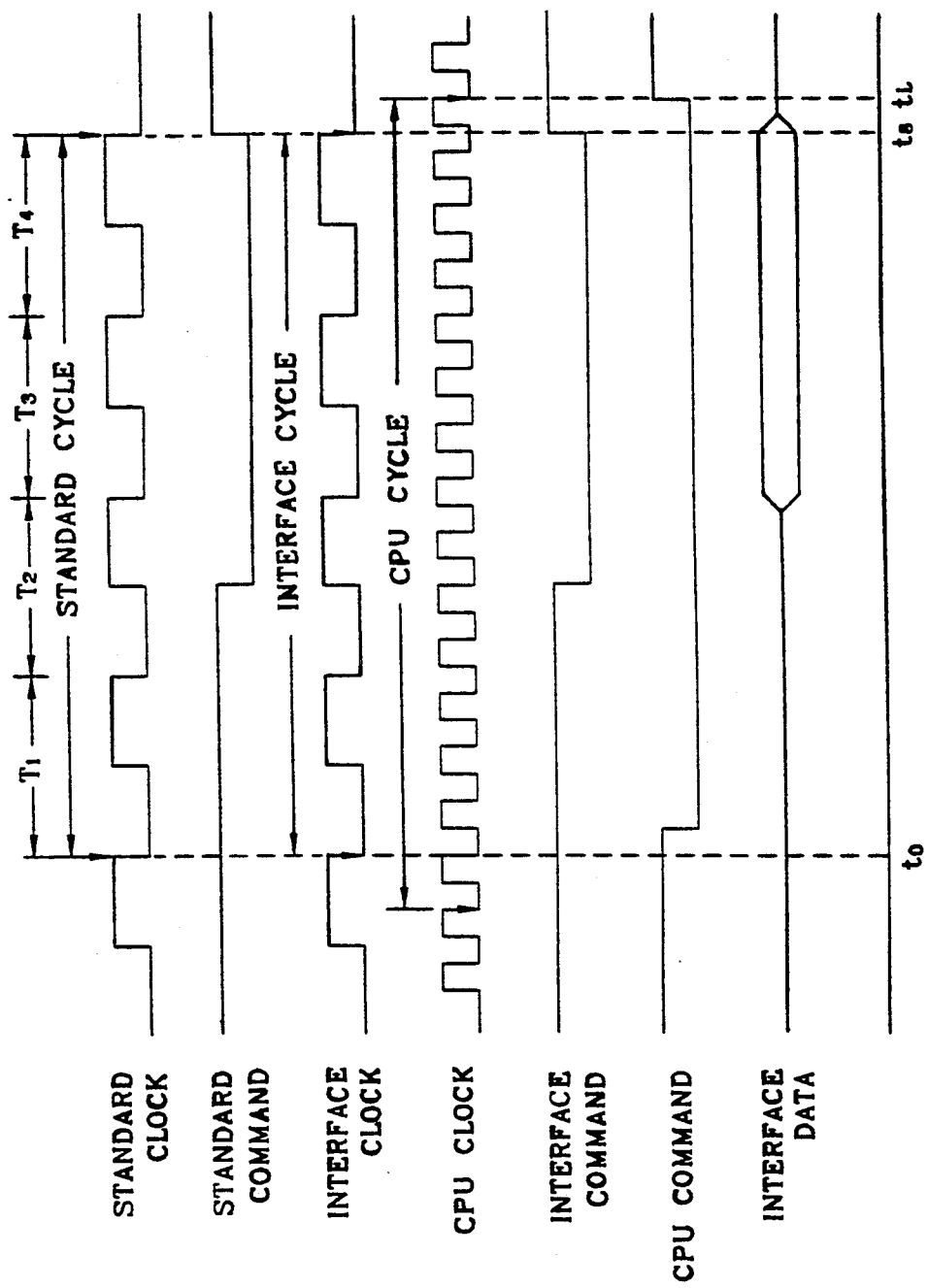

FIG. 8 is a timing diagram illustrating yet another prior art interface control system. As shown in FIG. 8, the interface clock signal and the interface command are substantially the same as the standard clock and the standard command. The CPU clock signal remains at a high frequency. When the CPU wishes to access the interface, the CPU does not begin its access but waits until the CPU clock signal is in phase with the interface clock (such as at time t0) and the CPU cycle does not terminate until a time tL. Such method enables the CPU to function at high speed CPU clock frequency, thereby not adversely affecting parallel processes in the CPU. But since the interface cycle terminates at a time t8, the data present on the interface bus disappears at t8, the end of the interface cycle. This is earlier than time tL at which time the CPU cycle terminates and completes its access to the interface. Hence, to insure that the CPU can safely access the data at the end of the CPU cycle at time tL, a temporary storage circuit must be designed to store the data present on the interface bus at a time before t8 so that the CPU may access the data from such temporary storage circuit before or at the end of the CPU cycle at time tL. Furthermore, the CPU cycle and the standard cycle do not conclude at the same time which results in inefficiency in the system for reasons described above.

Thus one object of the invention is to provide an interface control system which improves the compatibility between a high speed CPU and a standard expansion interface. Another object is to provide an interface control system which enables the CPU to operate at a high speed clock frequency during most of the CPU cycle. Another object is to provide an interface control system which enables the CPU cycle, interface cycle and standard cycle to conclude at the same time. Another object of the invention is to provide an interface control system which requires no temporary storage device to store the data present on the interface bus. Other objects and advantages of the invention are illustrated further below in reference to the remaining figures.

Figure 9:
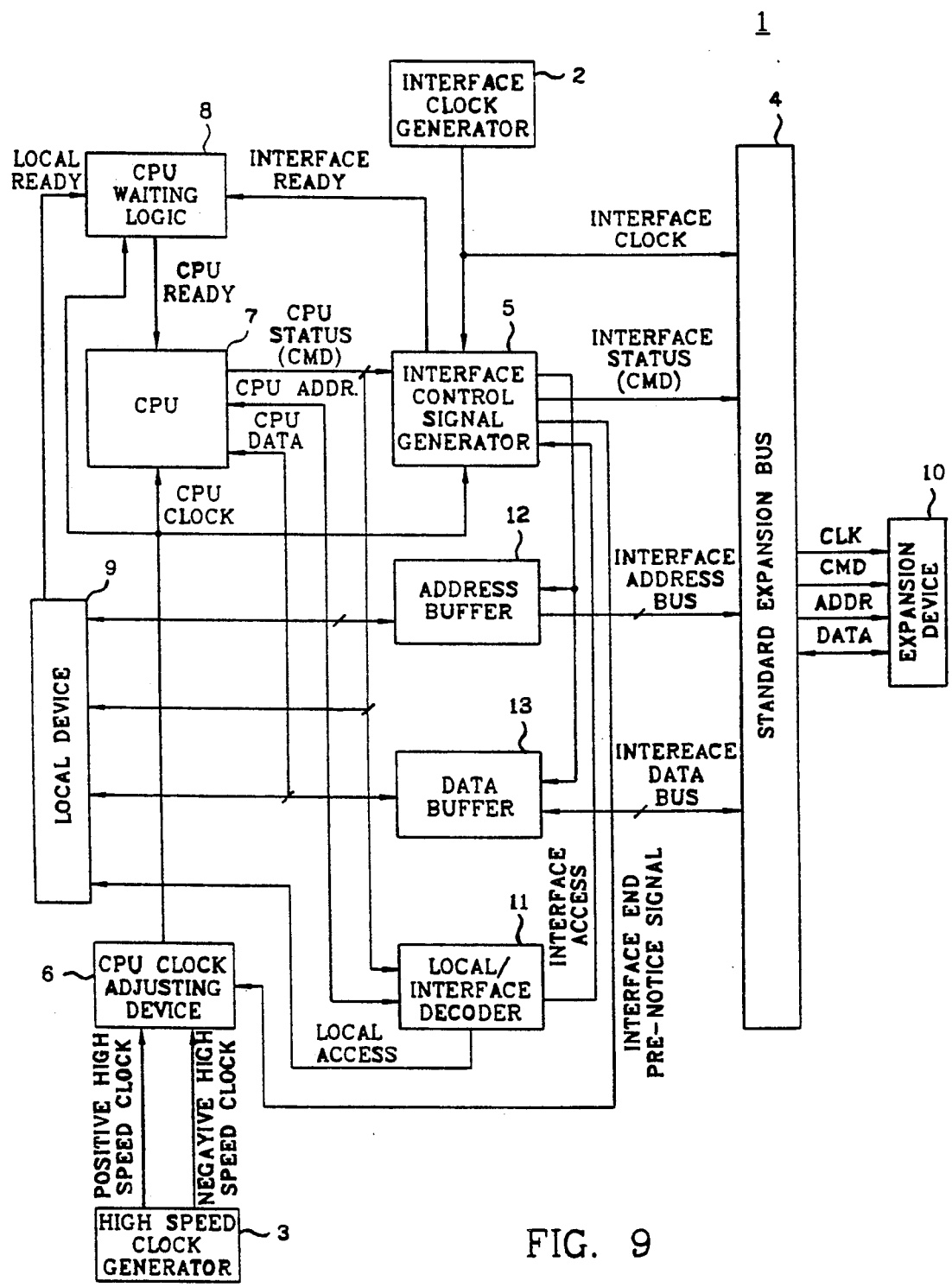
FIG. 9 is a functional block diagram of an interface control system of the preferred embodiment of the present invention.

FIG. 9 is a functional block diagram of an interface control system according to a preferred embodiment of the invention. As shown in FIG. 9, interface control system (1) includes two sources of clock signals: the interface clock generator (2) and high speed clock generator (3). Interface clock generator (2) supplies an interface clock signal to the standard expansion bus (4) and the interface control signal generator (5). The high speed clock generator (3) supplies a positive high speed clock signal and a negative high speed clock signal to the CPU clock adjusting device (6). CPU clock adjusting device (6) generates an output in response to an interface end pre-notice signal from the interface control signal generator (5) and the positive and negative high speed clock signals from the high speed clock generator (3). The CPU clock adjusting device (6) supplies its output as the the CPU clock signal to the CPU (7), CPU waiting logic (8), and the interface control signal generator (5) to operate these devices.

When it is desirable for CPU (7) to access local device (9) or expansion device (10), CPU (7) applies signals such as CPU status and CPU address signals to the local/interface decoder (11). If the local/interface decoder (11) decodes and interprets the CPU status signal to be that the CPU wishes to access the local device (9), decoder (11) supplies a local access signal to local device (9) to initiate device (9).

After local device (9) has been initiated, CPU (7) is operated by the CPU clock signal to store or retrieve data from local device (9) through the CPU data bus. When local device (9) is ready to be accessed by CPU (7), local device (9) supplies a local ready signal to CPU waiting logic (8). CPU waiting logic (8) then supplies a CPU ready signal to inform CPU (7) to complete the storing or retrieving process from local device (9). Since such technique for accessing local device (9) is conventional, it will not be described in detail.

If the local/interface decoder (11) decodes the CPU status signal as the CPU's command to access the expansion device (10), then decoder (11) applies an interface access signal to the interface control signal generator (5). In response to the interface access signal from decoder (11), generator (5) applies an interface status signal (e.g. interface command) to standard expansion bus (4). The interface status signal is derived in accordance with the CPU status signal from CPU (7) and is supplied to bus (4). The standard expansion bus (4) then supplies the interface clock signal, interface status signal and interface address signal to expansion device (10). As described in detail below in reference to FIG. 10A, if the access signals such as clock, status (command) and address signals supplied by bus (4) to device (10) all comply with the specifications of device (10), device (10) then supplies the data desired by the CPU through bus (4), an interface data bus, and data buffer (13) to a local data bus so that the CPU may retrieve such data.

This invention is based on the observation that the various difficulties present in conventional systems can be alleviated by picking a predetermined time during the standard cycle (which is also the interface cycle) at which point the CPU clock signal is adjusted so that the CPU cycle concludes at the same time as the standard and interface cycles. Before such time, the CPU continues to function according to its unchanged high speed clock. This insures the compatibility between the CPU and expansion interface and enables data access to the interface without wasting CPU clock cycles. The CPU clock signal does not need to be an integral multiple of that of the interface clock. For a large part of the standard cycle (and therefore the CPU cycle), that is the portion of the cycle before the predetermined time, the CPU clock signal remains at its original high speed. Therefore any process operated by the CPU in parallel to accessing the expansion interface is carried out at the original high speed CPU clock. Therefore, the efficiency of the CPU in such parallel processes is not significantly compromised.

Thus, before the end of the CPU cycle and before the CPU retrieves the data from the CPU (local) data bus through buffer (13), interface control signal generator (5) applies an interface end pre-notice signal to CPU clock adjusting device (6), notifying device (6) that the interface cycle is about to end and that the CPU clock signal needs to be forced to fall at the same time as the interface clock signal, both occurring at the end of the interface cycle (which is also the end of the standard cycle). In other words, the interface end pre-notice signal signifies the predetermined time within the interface cycle described above. The CPU clock adjusting device (6) adjusts the CPU clock signal before the end of the CPU cycle in response to the interface end pre-notice signal, so that the CPU cycle ends at the same time as the interface cycle. As described in more detail below, device (6) selects between the positive high speed clock and the negative high speed clock to be the CPU clock signal after the end of the CPU cycle.

Figure 10A:
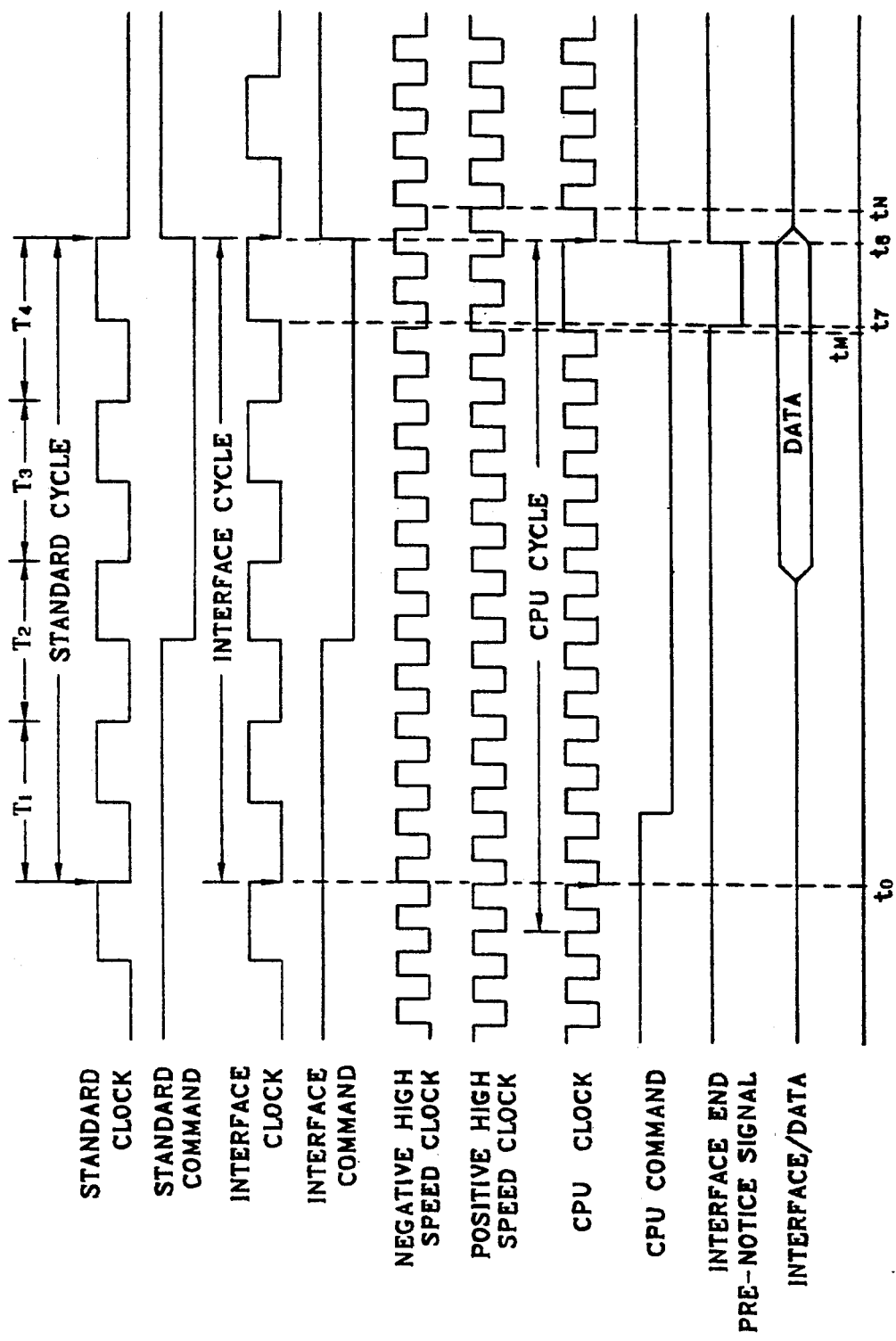
FIGS. 10A and 10B are timing diagrams for illustrating the timing relationship of signals in the system of FIG. 9 when the system is used for accessing data in standard expansion devices.

FIG. 10A is a timing diagram to illustrate the process by which CPU (7) accesses device (10). In FIG. 10A, the standard clock is the clock standard for accessing expansion device (10). The interface clock is the interface clock signal supplied by generator (2) to the standard expansion bus (4). The CPU clock is the output signal of adjusting device (6) applied to CPU (7) for operating the CPU. Initially, device (6) selects between the negative and positive high speed clocks to become its output signal; in the embodiment of FIG. 10A, and before time t7, the positive high speed clock is selected by device (6) to be its output.

As shown in FIG. 10A, the interface clock selected by this invention is synchronous with the standard clock for device (10). In addition, from time t0 to time tM, the CPU clock signal remains at its original high speed; which means that the CPU is operated at high speed. From time tM to time t8, in order for the CPU cycle and the interface cycle to terminate at the same time t8, the CPU clock signal is forced to remain at logic high level, or "1". During the time interval t8 to tN, in order for the CPU clock signal to once again follow the positive or negative high speed clock supplied by generator (3), the CPU clock signal is forced to remain at logic low, or "0".

It should be pointed out that FIG. 10A merely illustrates one of the two operating conditions when high speed CPU (7) stores data into or retrieves data from expansion device (10). The condition illustrated by FIG. 10A will be referred to below as condition 1. The storing or retrieving may be performed under an alternative operating condition referred to below as condition 2.

Figure 11A:
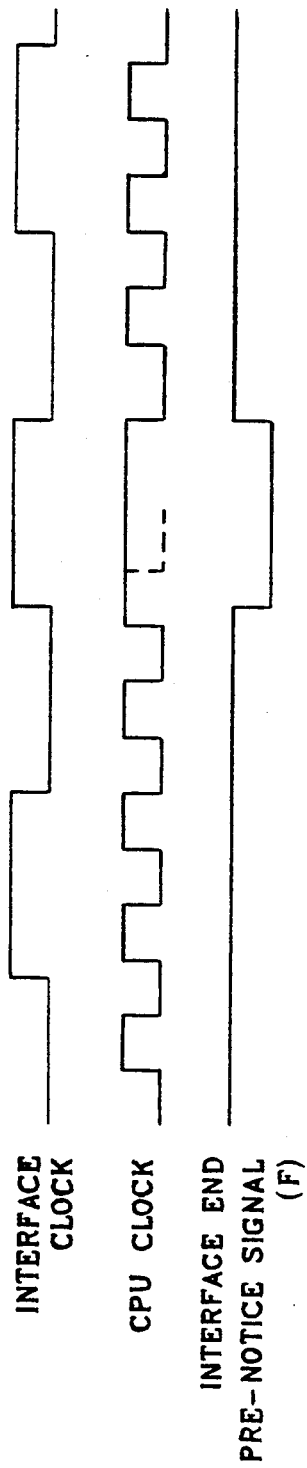
FIG. 11A illustrates in more detail operation condition (1) of the system of FIG. 9 where a high speed CPU (7) is used to access an expansion device (10).
Figure 11B:
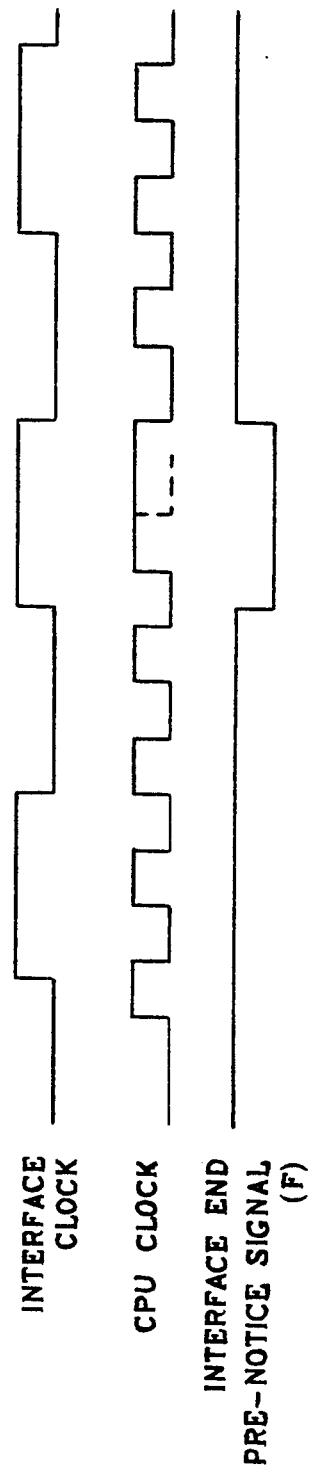
FIG. 11B is a timing diagram to illustrate operation condition (2) where a high speed CPU in the system of FIG. 9 is used to access an expansion device (10).

FIGS. 11A and 11B respectively illustrate conditions 1 and 2 referred to above. FIG. 11A illustrates with added detail the interface clock, the CPU clock and the interface end pre-notice signal of FIG. 10A. Thus under operating condition 1 illustrated in FIG. 11A, the interface end pre-notice signal (F) indicates the imminent event that the interface cycle is about to end by falling from logic high to logic low. If the CPU clock signal is at logic high or "1" before the interface end pre-notice signal falls from high to low, then the CPU clock signal adjusting device will prevent the CPU clock signal from falling as indicated in dotted line in FIG. 11A, but will force its output to remain at logic high or "1" until the end of the interface cycle. FIG. 11B illustrates operating condition 2 where the CPU clock signal is at logic low or "0" when the interface end pre-notice signal falls from high to low. In such event, adjusting device (6) permits the CPU clock signal to rise from logic low to logic high or "1" but forces the CPU clock signal to remain at "1" thereafter, and does not permit it to fall to "0" as indicated by a dotted line in FIG. 11B until the end of the standard cycle.

It is also worth noting that after the termination of the CPU cycle, when the CPU clock adjusting device (6) switches its output signal to follow the high speed clock signals from generator (3), there are again two possibilities. Device (6) can cause its output to follow the negative high speed clock or the positive high speed clock.

Figure 12A:
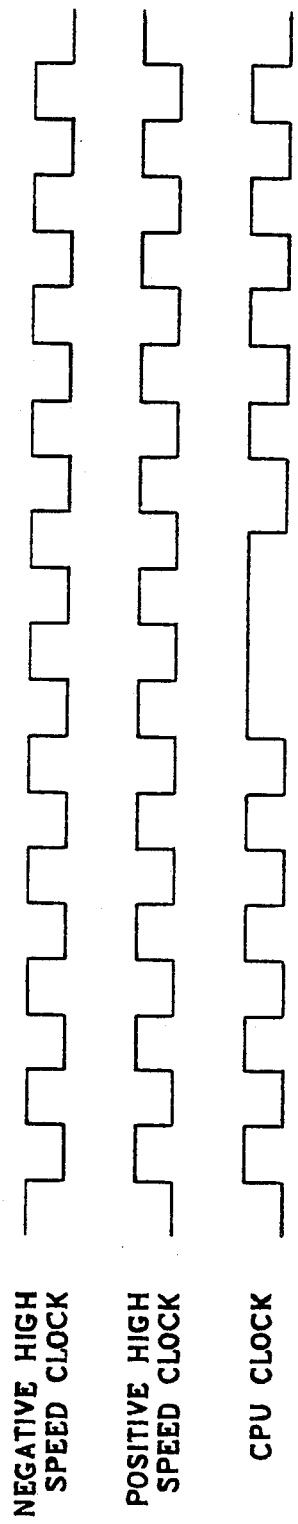
FIG. 12A is a timing diagram to illustrate how the CPU clock adjusting device (6) causes the negative CPU clock signal to be applied to the CPU.
Figure 12B:
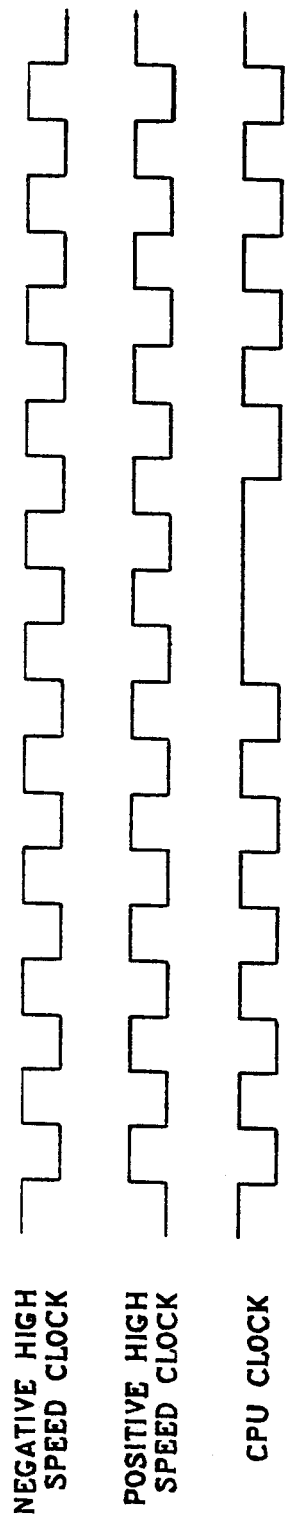
FIG. 12B is a timing diagram to illustrate how the CPU clock adjusting device (6) in the system of FIG. 9 causes the positive CPU clock signal to be applied to the CPU.

FIGS. 12A and 12B respectively, illustrate the two possibilities. FIG. 12A is an enlarged view of the negative and positive high speed clocks and the CPU clock of FIG. 10A. As shown in FIG. 12A, when the CPU clock signal falls from high to low at the end of the CPU cycle at time t8, if the negative high speed clock is at logic high (i.e. the positive high speed clock at logic low), then the CPU clock signal is maintained at logic low until the negative high speed clock rises from logic low to logic high at time tN, at which point device (6) causes its output to follow the negative high speed clock. FIG. 12B illustrates the second possibility where when the CPU clock signal falls from logic high to logic low at time t8 at the end of the CPU cycle, if the negative high speed clock is at logic low (i.e. positive high speed clock at logic high), then the CPU clock signal is maintained low until the positive high speed clock changes from logic low to logic high at time tN, whereupon device (6) causes its output to follow the positive high speed clock.

Figure 13A:
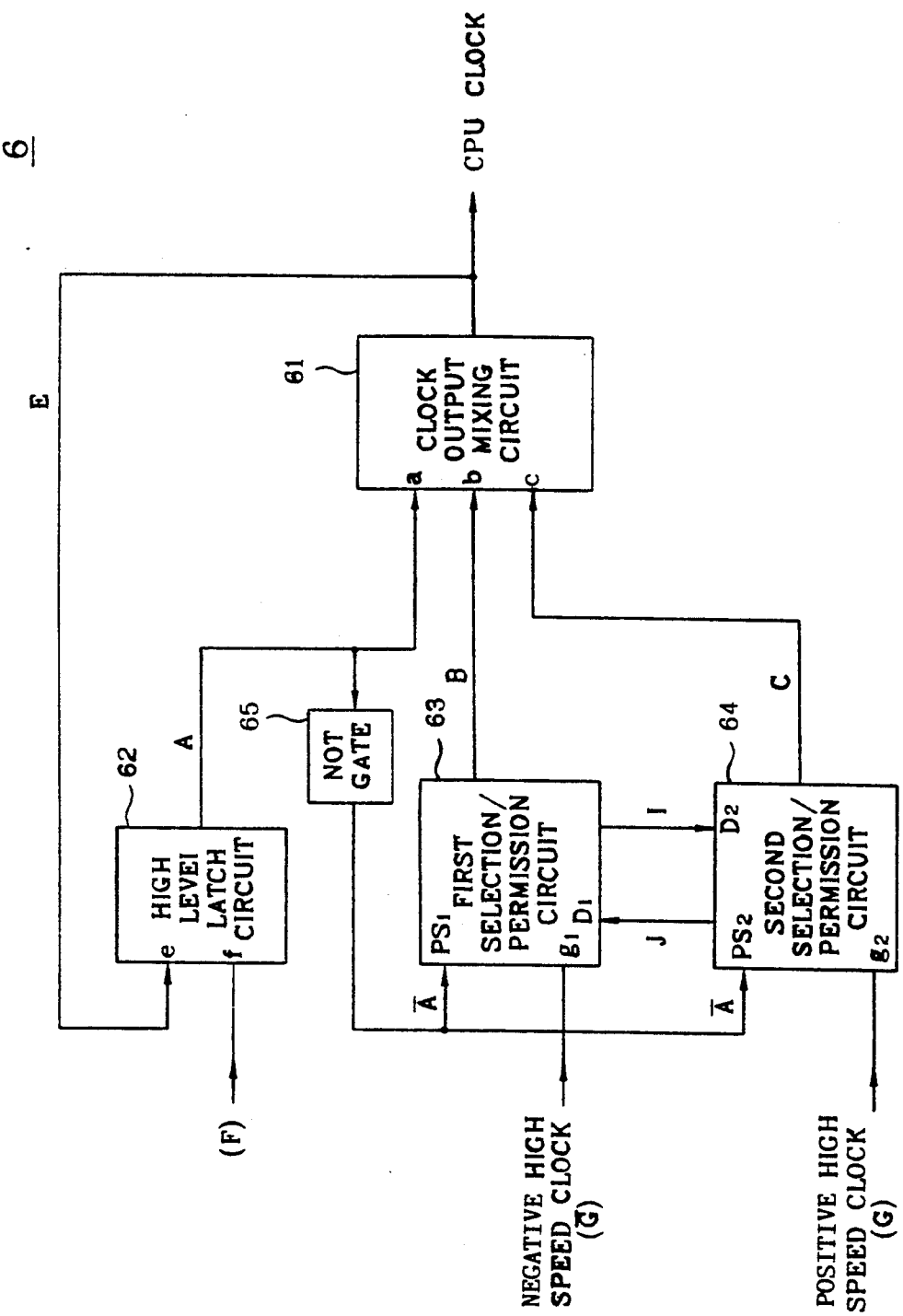
FIG. 13A is a detailed block diagram of the CPU clock adjusting device (6) of FIG. 9.

FIG. 13A is a more detailed block diagram of the CPU clock adjusting device (6) of FIG. 9. Device (6) includes a clock output mixing circuit (61), a high level latch circuit (62), a first selection/permission circuit (63), a second selection/permission circuit (64) and a not gate (65). The interface end pre-notice signal (F) is applied to input f of the high level latch circuit (62). The negative high speed clock $\overline{G}$ is supplied to clock input g1 of the first selection/permission circuit (63). The positive high speed clock G is supplied to the clock input g2 of the second selection/permission circuit (64).

The outputs A, B, C of respectively the high level latch circuit (62), the first and second selection/permission circuits (63), (64) are applied respectively to inputs a, b, c of clock output mixing circuit (61).

The output A of the latch circuit is also applied to the preset terminals PSI, PS2 of the two selection/permission circuits through the not gate (65). The first selection/permission circuit (63) applies inhibit signal I to the second selection/permission circuit (64). The second selection/permission circuit (64) also applies an inhibit signal J to the first selection/permission circuit (63).

Figure 13B:
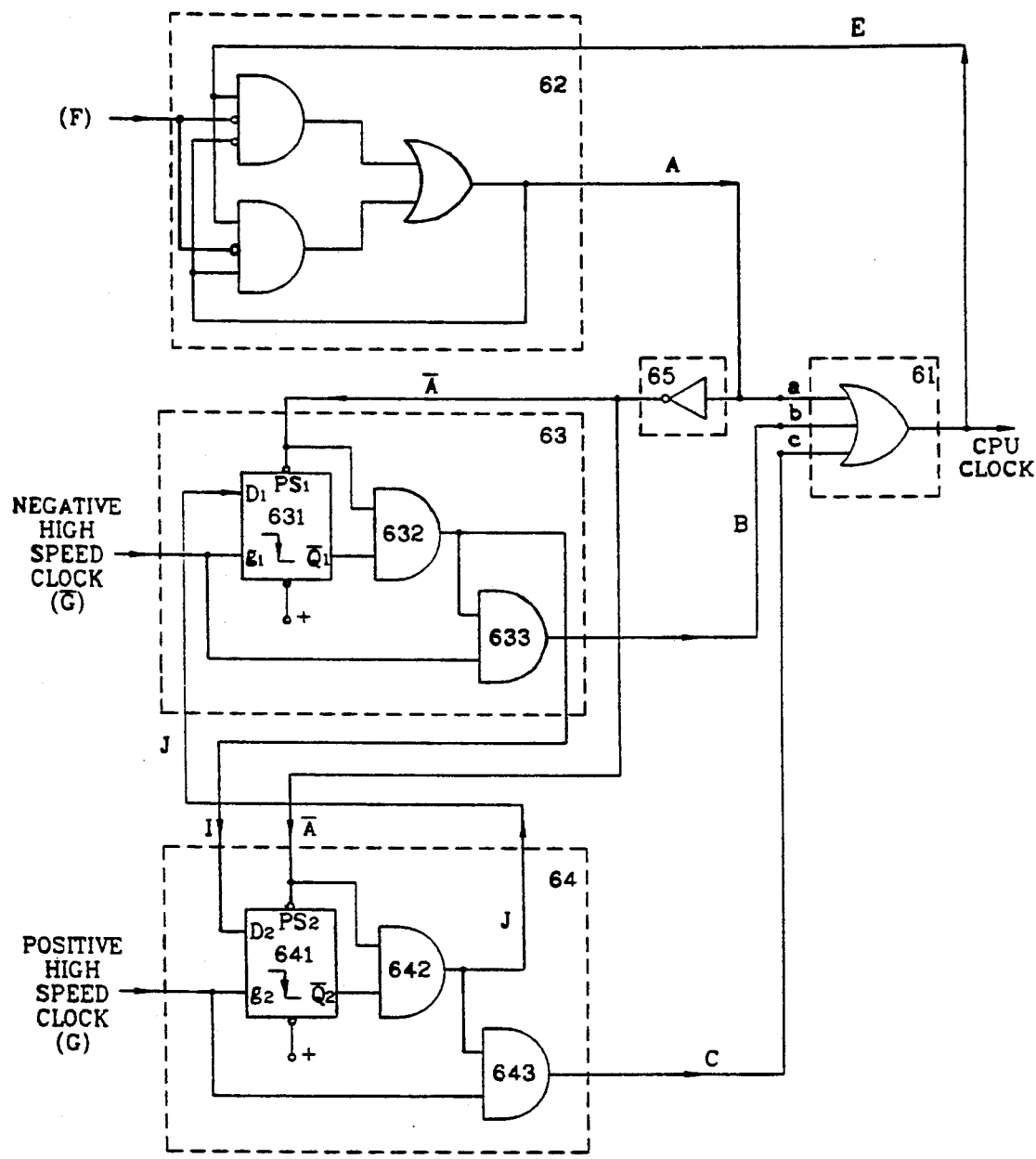
FIG. 13B is a schematic circuit diagram of the CPU clock adjusting device (6) of FIG. 13A.
Figure 13C:
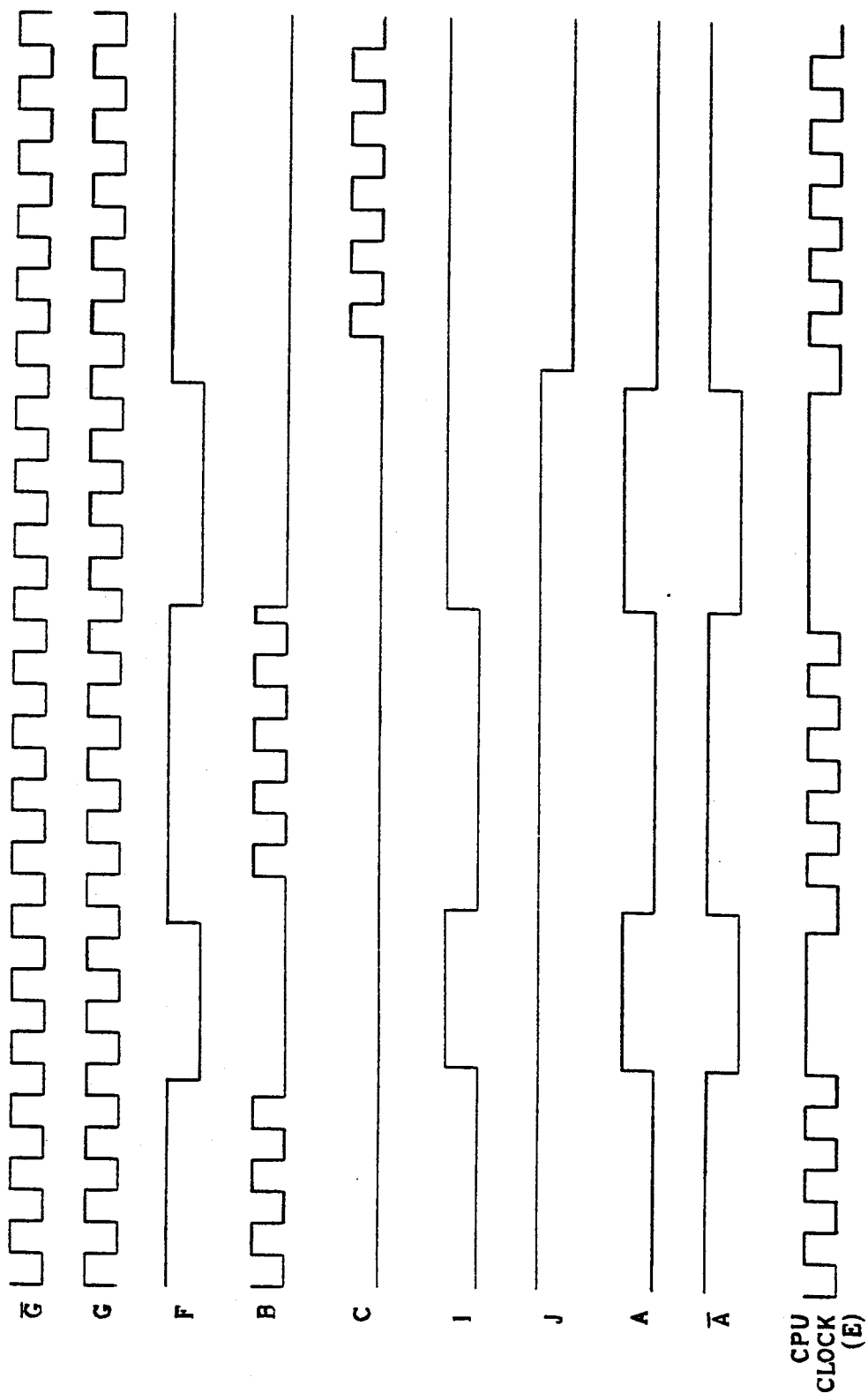
FIG. 13C is a timing diagram to illustrate the relationship of signals in the circuits of FIG. 9 and FIG. 13B.

The operation of the CPU clock adjusting device (6) of FIG. 13A is illustrated in reference to the schematic circuit diagram of circuit (6) of FIG. 13B and timing diagram FIG. 13C.

The output E of the clock output mixing circuit (61) is the output of device (6), i.e. the CPU clock signal applied to the CPU (7). The output of circuit (61) is determined by signals A, B, and C since circuit (61) may simply be an OR-gate as shown in FIG. 13B. As shown in FIG. 13B, the output of circuit (61) is high or "1" when one or more of A, B, and C is high; and the output of circuit (61) is low when all three inputs are low. Output E is also fed back to the latch circuit (62). The output A of latch circuit (62) is determined by inputs F and E.

Circuit (6) of FIG. 13B performs a number of functions. When the interface cycle end pre-notice signal F is high, the output E of device (6) simply follows the positive or negative high speed clock, depending on the initial conditions of device (6).

Figure 10B:
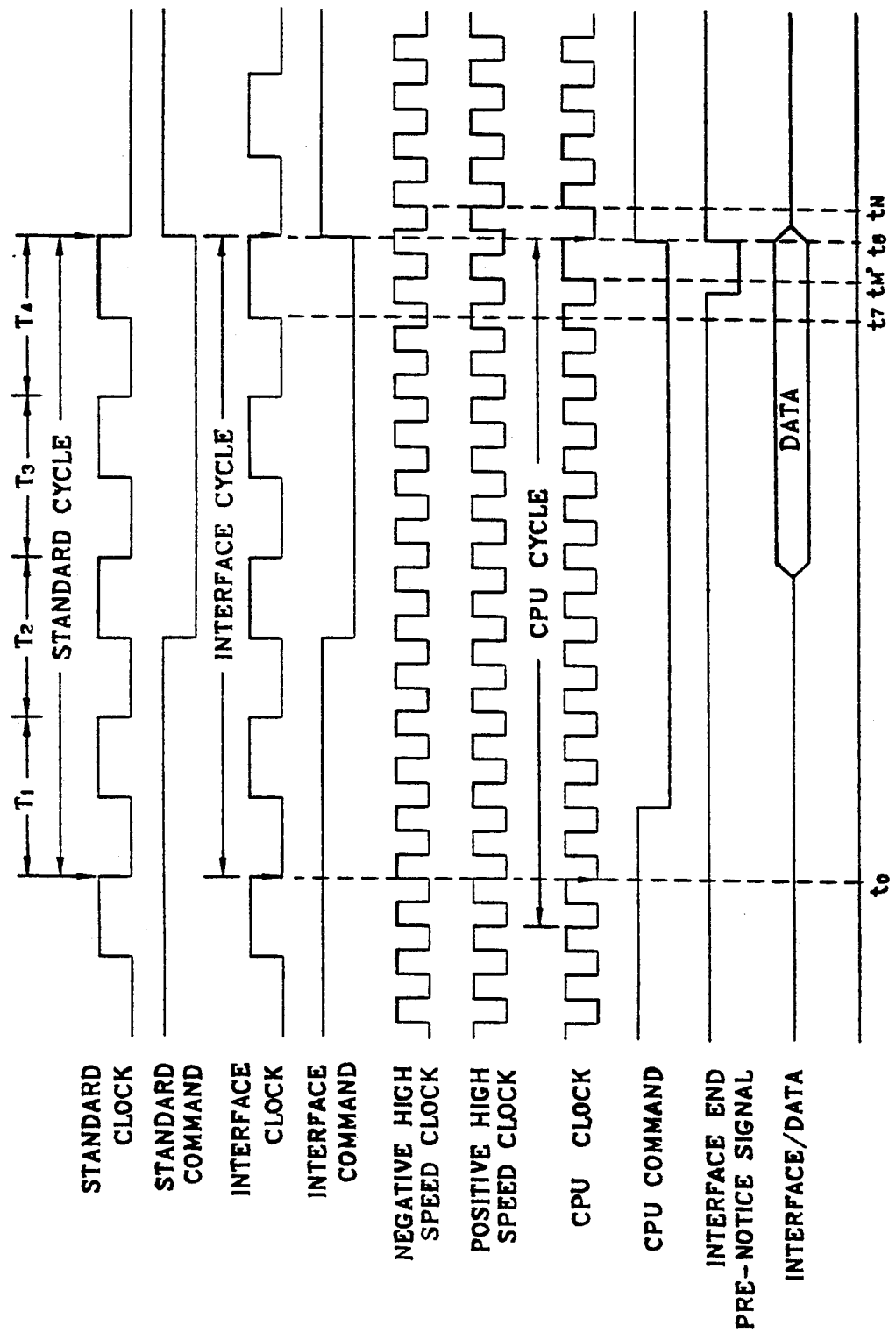

In reference to FIGS. 10A, 10B and 13B, and before time t7, since signal F is "1", signal A is "0" and signal "$\overline{A}$" is "1". When signal $\overline{A}$ is "1", this means that either the positive or the negative high speed clock is selected to be the CPU clock. This is explained in more detail as follows.

Inputs D1, D2 of flip-flops 631, 641 can have the following combination of values:
1. D1=D2=0;
2. D1=1, D2=0;
3. D1=0, D2=1; and
4. D1=D2=1.

When A=1, that is the complement of A supplied to AND-gates 632, 642 is "0", so that AND-gates 633, 643 prevent both the positive and negative high speed clocks from being passed to mixing circuit (61). It will be noted that it is the signal $\overline{A}$ that prevents the two high speed clock signals from being used as the CPU clock.

Next we will consider what happens when A falls from "1" to "0". When signal A is still "1", the inhibit signals I, J are both "0", so that the inputs D1, D2 are both "0". Hence when signal A falls from 1 to 0 so that its signal complement $\overline{A}$ rises from "0" to "1", the initial values of signals I, J, D1, D2 remain at "0". Thus, if the falling edge of the negative high speed clock $\overline{G}$ is supplied to flip-flop 631 before the falling edge of the positive high speed clock G is supplied to flip-flop 641, such falling edge of the negative high speed clock will cause output $\overline{Q1}$ to be a "1", since D1 is "0". The output of AND-gate 632 is also a "1" so that AND-gate 633 will permit the negative high speed clock $\overline{G}$ to be supplied through circuit (61) as the CPU clock signal. Since the output signal I of AND-gate 632 is a "1", this causes the output $\overline{Q2}$ of flip-flop 641 to be a "0" upon reception of the falling edge of the positive high speed clock. This causes the output J of AND-gate 642 to be "0" so that the input D1 remains at "0". This also causes AND-gate (642) to prevent the positive high speed clock G from being supplied to circuit (61) as the CPU clock. From the above, it is evident that the positive high speed clock is prevented by the inhibit signal I from becoming the CPU clock and not by the signal $\overline{A}$. Since signal D1 remains at "0", gate 633 continues to permit the negative high speed clock to be supplied to circuit (61) as the CPU clock. Conversely, if the flip-flop 641 receives the falling edge of the positive high speed clock before flip-flop 631 receives the corresponding edge of the negative clock, gate 643 will permit the positive high speed clock to be supplied as the CPU clock and the negative high speed clock will be prevented by inhibit signal J from being the CPU clock.

The condition D1=D2=1 is not possible in the circuit of FIG. 13B. Even if the initial values of D1 and D2 are "1", when signal $\overline{A}$ is "0", both inputs D1, D2 will become "0". When signal $\overline{A}$ is "1", even if the initial values of D1, D2 are both "1", because of the interlocking nature of flip-flops 631, 641 as shown in FIG. 13B, one of the two signals D1, D2 will be "0" and the remaining one will be "1". In other words, as soon as device (6) is turned on, when signal F is "1" (A=0, $\overline{A}$=1), one of the two high speed clocks will become the CPU clock.

In FIGS. 10A and 10B, the condition of device (6) illustrated is where the positive high speed clock G is supplied as the CPU clock. The above description summarizes the functioning of device (6) when the signal F is at "1".

When the interface cycle end pre-notice signal F falls from logic high to logic low or from "1" to "0", this causes signal A to go from "0" to "1" as described above.

When the interface cycle end pre-notice signal F falls from logic high to logic low, the output of device (6) can be at logic high or logic low. When its output is at logic high, device (6) causes its output to be maintained at the logic high state until signal F rises again to logic high. If the output E of device (6) is at logic low when signal F falls from high to low, device (6) causes its output E to be maintained at logic high after the signal E rises to logic high at the frequency and phase of the clock signal supplied by generator (3). When the interface end pre-notice signal F rises from low to high at time t8 at the end of the interface and CPU cycles, device (6) responds by pulling its output low. Then, depending on the logic state of the positive and negative high speed clocks at the moment when device (6) pulls its output low at the end of the interface and CPU cycles, device (6) causes its output to follow one of the two high speed clock signals.

When the interface cycle end pre-notice signal F falls from high to low, the logic state of the output E of device (6) can be at one of two possible logic states (at logic high in FIG. 10A and at logic low in FIG. 10B). Thus if signal E is at "1" and signal F falls from "1" to "0", the output of latch circuit (62) will be "1" as is evident from the logic structure of circuit (62). Signal A will remain at "1" until signal F changes state again. Therefore, output signal E of device (6) will also remain at "1" until signal F changes state. This is illustrated in FIG. 10A. If output E of device (6) is at logic low as shown in FIG. 10B when signal F falls from "1" to "0", the output of device (6) will remain at logic low until it follows the positive high speed clock high. When this happens, the output A of latch circuit (62) goes high and will remain high until signal F changes state again. Consequently the output E of device (6) also remains high until signal F changes state, as illustrated in FIG. 10B.

When the interface end pre-notice signal F rises from "0" to "1" at time t8, then the output A of latch circuit (62) falls from "1" to "0". Not gate (65) causes the compliment of output A of latch (62) to be applied to the preset terminals PS1, PS2 of circuits (63), (64). Therefore when signal A is at "1", which happens when the output E of device (6) is forced to remain high as described above, the negative output $\overline{Q1}$, $\overline{Q2}$ of circuits (63), (64) are "0". In such event, the outputs B, C are both "0". Therefore the output E of device (6) simply follows output A of the latch circuit (62). Furthermore, when signal A is high, the outputs of AND-gates (632), (642) are both low so that both inhibit signals I, J are at "0".

The two selection/permission circuits (63), (64) are identical circuits. Both change states in response to the negative edge of clock signals applied to inputs g1, g2. Each circuit also includes two AND-gates. When one of the two selection/permission circuits selects and permits the clock signal applied to it to be passed to input b or c of gate (61), such circuit also inhibits the other circuit from doing the same. Thus at time t0 in FIG. 10A, the output E of device (6) follows the positive high speed clock G. For this to be true, gate (643) must pass the positive clock signals. Hence, the output of gate (642) must be high. In other words, signal A must be "0" and the negative output of flip-flop (641) must be "1". The output J of AND-gate (642) is therefore at "1". This permits the positive high speed clock G to be passed through AND-gate (643) to input c of gate (61).

Since the output J of gate (642) is applied to input D1 of flip-flop (631), the negative output of flip-flop (631) is therefore at "0". This causes the output I of gate (632) to be at "0", which inhibits gate (633) from passing the negative high speed clock to input B of gate (61). If instead of permitting the positive clock from being applied to gate (61), circuit (63) permits the negative high speed clock to be applied to input b of gate (61), similarly the inhibit signal I will be high to inhibit circuit (64) from passing the positive high speed clock to input C of gate (61). Thus at any time, at most one of the two high speed clocks will be applied to gate (61), and never both.

From the above, if it is desired that one of the two high speed clocks be supplied to circuit (61), output A of the latch circuit must be "0". In such event, whether the positive or the negative high speed clock will be passed to circuit (61) depends on the relative timing relationships between the falling edge of the two clocks after the end of the CPU cycle at t8. If the falling edge of the negative high speed clock reaches input G1 of circuit (63) before the falling edge of the positive high speed clock reaches input G2, then device (6) permits the negative high speed clock to be passed to circuit (61). Conversely, the positive high speed clock will be passed to circuit (61).

Since the compliment of signal A is applied to the preset terminals of the flip-flops (631), (641), both negative outputs of the two flip-flops are set to "0". Therefore both inhibit signals I, J are at "0". At the end of the CPU and interface cycles, signal F is pulled high so that signal E and therefore signal A are both pulled low as explained above. At this time, the compliment of signal A applied to one of the inputs of AND-gates (632) is high and the other input, the negative output of flip-flop (631), is low. The two inputs of AND-gate (642) are in similar logic states. For purpose of illustration, assume that the falling edge of the negative high speed clock reaches input g1 of flip-flop (631) before the falling edge of the positive high speed clock reaches input g2 of flip-flop (641). In such event, the negative output of flip-flop (631) is forced to high since the input D1 is at "0". This causes the output I of AND-gate (632) to be high, thereby permitting the negative high speed clock to be passed through gate (633) to input B of gate (61).

The high logic level of signal I inhibits circuit (64) from passing the positive high speed clock to input c of gate (61) in a manner described above. Similarly, if the falling edge of the positive high speed clock reaches input g2 of flip-flop (641) before the falling edge of the negative high speed clock reaches input g1 of flip-flop (631), the positive high speed clock will be passed by circuit (64) to input c of gate (61) and inhibit signal J will be at "1" to inhibit circuit (63) from passing to negative high speed clock to input B of circuit (61).

FIG. 13C illustrates more completely the timing relationships of the signals in FIG. 13B. It will be understood by those skilled in the art that various changes may be made without departing from the scope of the invention. Thus, as shown in FIG. 10B, the interface end pre-notice signal F may fall low at a time tM' which may be chosen to maximize the efficiency of the CPU. As shown in FIG. 10A signal F falls low at a time t7 where 3½ cycles of the standard clock (and of the interface clock) have passed. As shown in FIG. 10B, signal F falls low at a time which is later than t7. The selection of the time when signal F falls low is such that it should permit the output of device 6 to remain or be pulled high. Thus, the selection depends on the frequency of the high speed clock signals supplied by generator 3 relative to the frequency of the interface and standard clock signals. If the frequency of the high speed clock signals is less than twice that of the interface and standard clock signals (such as when the ratio of the high speed clock signal frequency to the standard clock frequency is 1:1.5 or 1:1.8), then signal F is forced low when 3½ cycles of the standard clock signal have passed such as at time t7 in FIG. 10A. If the high speed clock signals supplied by generator 3 are at frequencies which are twice or more than twice that of the standard and interface signals, the time when signal F is forced low can be delayed by a predetermined amount by a delay line from the time when 3½ cycles have passed. Thus the time at which signal F is forced low divides the standard cycle into two parts: an initial portion from time t0 to the predetermined time, and the remaining portion from the predetermined time to the end of the cycle t8 in reference to FIG. 10B. The amount of delay is selected such that the remaining portion of the standard cycle is greater than one cycle of the high speed clock supplied by generator 3. This permits the output of device 6 to remain or be pulled high irrespective of the phase of the high speed clock signals when signal F is forced low.

The frequency of the standard and interface clock signals and of the high speed clock signals supplied by generator 3 are known. A simple counter may be used together with the interface clock signal and the interface status signal to determine the time when 3½ cycles of the standard clock have passed (i.e. time t7 in FIG. 10A). Such designs are conventional. As explained above, when the frequency of the high speed clock is twice or more that of the standard clock, conventional delay lines may be used to delay the time when signal F is forced low. Thus in FIG. 10B, the high speed clock signals supplied by generator 3 have frequencies which are about three times that of the standard clock. For this reason, the time t7 at which signal F is forced is low may be delayed by a predetermined amount after the point in time which is when 3½ cycles of the standard clock have passed from since the beginning of the standard cycle. The technique illustrated above in reference to FIG. 10B maximizes the initial portion of the standard cycle during which the CPU is operated at high speed while still enabling the CPU clock to be pulled low at the end of the standard cycle. This improves the efficiency of the system. Thus the scope of the invention is to be limited only by the appended claims.

What is claimed is:

1. An interface control system for controlling data access through an interface having a standard cycle for data access, comprising:

a controller;

means for applying to the interface an interface clock signal, said interface signal having a frequency and phase such that it changes logic state at the end of the standard cycle;

means for generating a controller clock signal which is at a higher frequency than the interface clock signal; and means for adjusting the length of a cycle of the controller clock signal during the second half of the standard cycle, such that during at least the first half of the standard cycle, the controller is operated at the frequency of the controller clock signal and the portion of the standard cycle remaining after the adjusting means adjusts the controller clock signal is of a duration greater than a controller clock cycle but less than two controller clock signal cycles, and such that a change in the logic state of the controller clock signal occurs at the end of the standard cycle; and means for applying the adjusted controller clock signal to the controller, thereby enabling data access through the interface.

2. An interface control system for controlling data access through an interface having a standard cycle for data access, comprising:

a controller which generates status signals;

means for applying to the interface an interface clock signal, said interface signal having a frequency and phase such that it changes logic state at the end of the standard cycle;

means for generating a controller clock signal which is at a frequency higher than but less than twice that of the interface clock signal;

means for generating a standard cycle end pre-notice signal which changes state at a time which is substantially half an interface clock cycle before the end of the standard cycle to indicate the impending end of the standard cycle; and means responsive to the standard cycle end pre-notice signal for adjusting the length of a cycle of the controller clock signal such that a change in the logic state of the controller clock signal occurs at the end of the standard cycle, and for applying the adjusted controller clock signal to the controller, thereby enabling data access through the interface.

3. An interface control system for controlling data access through an interface having a standard cycle for data access, comprising:

a controller which generates status signals;

means for applying to the interface an interface clock signal, said interface signal having a frequency and phase such that it changes logic state at the end of the standard cycle;

means for generating a controller clock signal which is at a frequency more than twice that of the interface clock signal;

means for generating a standard cycle end pre-notice signal which changes state at a time which is less than half an interface clock cycle before the end of the standard cycle to indicate the impending end of the standard cycle; and means responsive to the standard cycle end pre-notice signal for adjusting the length of a cycle of the controller clock signal such that a change in the logic state of the controller clock signal occurs at the end of the standard cycle, and for applying the adjusted controller clock signal to the controller, thereby enabling data access through the interface.

4. An interface control system for controlling data access through an interface having a standard cycle for data access, comprising:

a controller which generates status signals;

means for applying to the interface an interface clock signal, said interface signal having a frequency and phase such that it changes logic state at the end of the standard cycle;

means for generating a controller clock signal which is at a higher frequency than the interface clock signal;

means for generating a standard cycle end pre-notice signal which changes state to indicate the impending end of the standard cycle; and a latch circuit responsive to the standard cycle end pre-notice signal for causing the controller clock signal to be a predetermined logic state when the standard cycle end pre-notice signal changes state, and for applying the controller clock signal to the controller, thereby enabling data access through the interface.

5. The system of claim 4, wherein said standard cycle end pre-notice signal changes state during the standard cycle and again at the end of the standard cycle, causing the controller clock signal to change state at such points in time.

6. The system of claim 4, wherein said generating means generates two clock signals including a positive and a negative clock signal, and further comprising:

means for detecting the changes in state of said two clock signals and for selecting one of the two clock signals to be the controller clock signal after the end of the standard cycle, said selection occurring in response to the logic states of the two clock signals at the end of the standard cycle.

7. The system of claim 4, further comprising feedback means for feeding back the adjusting means output to the latch circuit.

8. A method for controlling data access through an interface in an interface system including a controller for controlling the interface and its data access, said interface having a standard cycle for data access, comprising:

applying to the interface an interface clock signal having a frequency and phase such that it changes logic state at the end of the standard cycle;

generating a controller clock signal which is at a higher frequency than the interface clock signal; and adjusting the length of a cycle of the controller clock signal during the second half of the standard cycle, such that during at least the first half of the standard cycle, the controller is operated at the frequency of the controller clock signal and the portion of the standard cycle remaining after the step of adjusting the controller clock signal is of a duration greater than a controller clock cycle but less than two controller clock signal cycles, and such that a change in the logic state of the controller clock signal occurs at the end of the standard cycle and applying said adjusted signal to the controller, thereby enabling data access through the interface.

9. A method for controlling data access through an interface in an interface system including a controller for controlling the interface and its data access, said interface having a standard cycle for data access, comprising:

applying to the interface an interface clock signal, said interface signal having a frequency and phase such that it changes logic state at the end of the standard cycle;

generating a controller clock signal which is at a frequency higher than but less than twice that of the interface clock signal;

generating a standard cycle end pre-notice signal which changes state at a time which is substantially half an interface clock cycle before the end of the standard cycle to indicate the impending end of the standard cycle; and adjusting the length of a cycle of the controller clock signal in response to the standard cycle end pre-notice signal such that a change in the logic state of the controller clock signal occurs at the end of the standard cycle, and for applying the adjusted controller clock signal to the controller, thereby enabling data access through the interface.

10. A method for controlling data access through an interface in an interface system including a controller for controlling the interface and its data access, said interface having a standard cycle for data access, comprising:

applying to the interface of an interface clock signal, said interface signal having a frequency and phase such that it changes logic state at the end of the standard cycle;

generating a controller clock signal which is at a frequency more than twice that of the interface clock signal;

generating a standard cycle end pre-notice signal which changes state at a time which is less than half an interface clock cycle before the end of the standard cycle to indicate the impending end of the standard cycle; and adjusting the length of a cycle of the controller clock signal in response to the standard cycle end pre-notice signal such that a change in the logic state of the controller clock signal occurs at the end of the standard cycle, and for applying the adjusted controller clock signal to the controller, thereby enabling data access through the interface.

11. A method for controlling data access through an interface in an interface system including a controller for controlling the interface and its data access, said interface having a standard cycle for data access, comprising:

applying to the interface an interface clock signal, said interface signal having a frequency and phase such that it changes logic state at the end of the standard cycle;

generating a controller clock signal which is at a higher frequency than the interface clock signal;

generating a standard cycle end pre-notice signal which changes state to indicate the impending end of the standard cycle; and in response to the standard cycle end pre-notice signal, causing the controller clock signal to be a predetermined logic state when the standard cycle end pre-notice signal changes state, and applying the controller clock signal to the controller, thereby enabling data access through the interface.

12. The method of claim 11, wherein said standard cycle end pre-notice signal changes state during the standard cycle and again at the end of the standard cycle, causing the controller clock signal to change state at such points in time.

13. The method of claim 11, wherein said generating step further comprises generating two clock signals including a positive and a negative clock signal, and further comprising:

detecting the changes in state of said two clock signals and for selecting one of the two clock signals to be the controller clock signal after the end of the standard cycle, said selection occurring in response to the logic states of the two clock signals at the end of the standard cycle.

* * * * *